April 7, 1959    F. O. ORITT    2,881,078
METALLIC FOIL FOOD PACKAGING AND COOKING ENVELOPE
Filed Oct. 8, 1956

INVENTOR.
FLORENCE O. ORITT
BY John A. Robertson
ATTORNEY.

United States Patent Office 2,881,078
Patented Apr. 7, 1959

2,881,078

METALLIC FOIL FOOD PACKAGING AND COOKING ENVELOPE

Florence O. Oritt, Philadelphia, Pa., assignor of one-half to Jack Oritt, Philadelphia, Pa.

Application October 8, 1956, Serial No. 614,652

4 Claims. (Cl. 99—171)

The present invention relates to an envelope or pouch that is intended to be used in the packaging of food, and is concerned primarily with an envelope that is particularly adapted for cooking the food while contained therein.

At the present time, there are certain types of food which require cooking for only a comparatively brief interval. Minute steaks are a good example of such a food. Such minute steaks are ordinarily sold under directions that they be cooked for a period ranging from thirty to sixty seconds. In accordance with present-day practice, these steaks are cooked in a frying pan or broiler, with attending inconvenience to the user.

The present invention is founded on the belief that there are certain foods, particularly meat products such as minute steaks, thin hamburger patties, and the like, which are susceptible of being properly cooked in the conventional electric toaster, with the proper cooking period for the foods lying within the range of the time periods for such toasters. It is further noted that the modern trend in the packaging of food is to provide individual wrappings for each serving or portion such as a minute steak, cheese slab, hamburger patty, and the like.

With the foregoing conditions in mind, the present invention has in view as its foremost objective the provision of an individual envelope or pouch that is intended for use in the packaging and cooking of food, and which envelope is particularly characterized as being made from a metallic foil or a comparable heat-resistant material such as certain plastics whereby it is adapted for insertion into the cooking compartment of a conventional electric toaster.

In providing a metallic foil envelope for certain food products such as minute steaks, hamburger patties, and the like, provision must be made for having the toaster perform the desired cooking operation on the meat. Thus, if a minute steak is to be broiled or fried, the cooking operation must be of this nature, and not one of a steaming or stewing character. This means that provision must be made for permitting the escape of steam and vapors from the top of the envelope, and also for the collection of fats and other juices that are generated by the cooking operation at the bottom in a position removed from the meat itself.

Thus, another object of the invention is to provide a metallic envelope of the character aforesaid which has a top that is ordinarily sealed or closed up to the time that the food contained therein is to be cooked, but which is readily adapted to benig opened to permit the escape of steam and vapors during the cooking operation.

Still another object of the invention is to provide a metallic foil envelope of the type above indicated which is so constructed and arranged as to support the food product contained therein over and above a bottom pouch or recess that is designed to receive the fats and juices generated during cooking, with this pouch or recess being in direct communication with that portion of the envelope which receives and supports the food.

When a metallic foil envelope of the character aforesaid, together with the food which is contained therein, is inserted in an electric toaster, it is desirable that there be a portion or tab that projects above the top of the toaster so as to be conveniently available for use as a handle in removing the envelope from the toaster. Thus another object in view is to provide a metallic foil envelope of the character aforesaid which includes a handle or tab portion which extends above and beyond the open top.

In accordance with the present-day merchandising of food, it is recognized that individual metallic foil envelopes of the type above discussed will be sold in multiple units. With this thought in mind, a further object of the invention is to provide a package unit comprising a plurality of individual metallic foil envelopes each containing an individual serving or portion of a food, with the several units attached together into a single package assembly.

Another somewhat more detailed object of the invention is to provide a package unit of the type noted in which the several metallic foil envelopes are secured together by stitching, crimping, or adhesives along appropriate lines or areas spaced from the top and one side edge of the envelopes so that a single envelope may be removed from the unit by simply pulling it therefrom with the stitching or crimping severing the metallic foil along the stitch lines, thereby leaving an open top and a handle tab at one side.

Various other more detailed objects and advantages of the invention, such as arise in connection with carrying out the above-noted ideas in a practical embodiment, will in part become apparent and in part be hereinafter stated as the description of the invention proceeds.

The invention therefore comprises a package unit consisting of a plurality of individual metallic foil envelopes each containing a food to be cooked, with the several envelopes being secured together by stitching along lines spaced from the top and one side edge of the envelopes, respectively, whereby, when an envelope is pulled from the package unit, the stitching will sever the envelope to leave an open top and a handle at one side, with the envelope being formed with a pouch or recess at the bottom, above which the food element is maintained in spaced relation.

For a full and more complete understanding of the invention, reference may be had to the following description and accompanying drawing, wherein.

Figure 1:
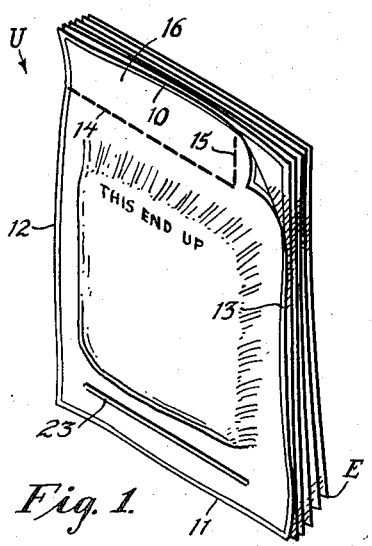
Figure 1 is a perspective view of a package unit comprising a plurality of the metallic foil envelopes of this invention.
Figure 3:
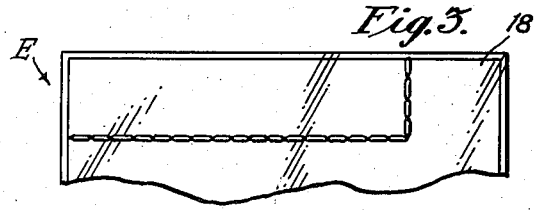
Figure 3 is a fragmentary view taken as a front elevation of the upper portion of the package unit.

Referring now to the drawing, wherein like reference characters denote corresponding parts, and first more particularly to Figure 1, a package unit is therein illustrated, and referred to in its entirety by the reference character U. The unit U is made up of a plurality of individual metallic foil envelopes each identified by the reference character E, and all of which are substantially alike.

Figures 2, 4:
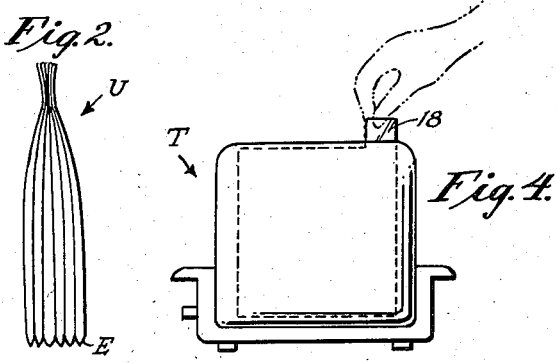
Figure 2 is a view in side elevation of the envelopes shown in Figure 1.
Figure 4 is a view in side elevation of an electric toaster with one of the metallic foil envelopes of this invention received therein, and disclosing the manner in which the handle tab projects above the toaster.

The envelopes E are of substantially rectangular formation whereby each of them is adapted for insertion into the cooking compartment of a conventional electric toaster such as illustrated in Figure 4, and referred to in its entirety by the reference character T. Thus, each of the envelopes E has a top edge 10, a bottom edge 11, and side edges 12 and 13.

In order to secure the envelopes E together in assembled relation in the package unit U, stitching is employed. As shown in Figure 1, this stitching is present along a line 14 that is spaced from and parallel to the top edges 10 of the several envelopes, and also along a second line 15 that is spaced from and parallel to the side edge 13. When one of the envelopes E is pulled from the unit U, this stitching along the lines 14 and 15 will sever the front and rear wall panels of the envelopes to leave a tab at 16, which will remain in the package unit, and a handle tab at 18 on the envelope which is removed.

Figure 6:
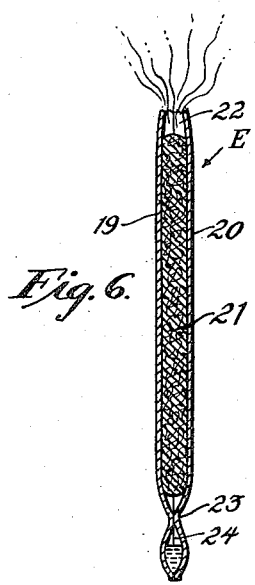
Figure 6 is a transverse vertical section taken about on the plane represented by the line 6—6 of Figure 5.
Figure 5:
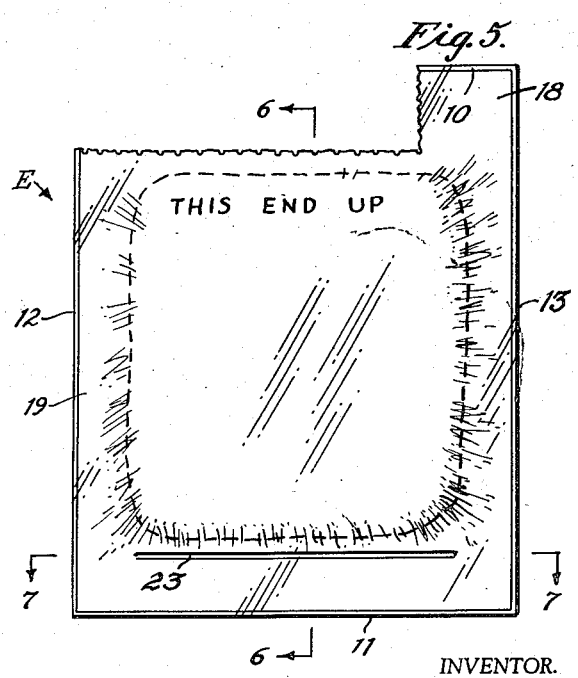
Figure 5 is a view in front elevation of one of the metallic foil envelopes after it has been removed from the package unit.
Figure 7:
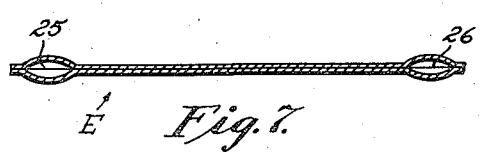
Figure 7 is a transverse horizontal section taken about on the plane represented by the line 7—7 of Figure 5.

Referring now more particularly to Figures 5, 6, and 7, each envelope E comprises a front wall or panel 19 and a rear wall or panel 20. These panels 19 and 20 are made from an appropriate metallic foil, such as an aluminum foil, with the two panels being adhesively secured together about the edges 10, 11, 12, and 13, respectively.

Received within the envelope between the panels 19 and 20 is the food element which is packaged therein and intended to be cooked while contained in the envelope. Thus, purely by way of illustration and not as a limitation on the invention, a minute steak is shown at 21 in Figure 6. It will be noted that this minute steak 21 occupies a position below the stitch line 14. Thus, when the envelope is removed from the package unit, the stitching severs the front and rear panels 19 and 20 along the stitch line 14, leaving an open top at 22 above the minute steak 21; and this open top 22 permits the escape of steam and vapors which are caused by the cooking operation.

The front and rear wall panels 19 and 20 are also secured together along a line 23 that is spaced from the bottom edge 11, as by an appropriate adhesive, so that the minute steak 21 is supported in a position above a bottom pouch or recess 24 that is formed by this securing of the front and rear wall panels together along the line 23. At each side of the minute steak 21 there are channels 25 and 26 which communicate with this recess 24 at the bottom. Thus, as the minute steak is being cooked, and fats and juices are created by the cooking operation, they will drain down through the channels 25 and 26 at each side and into the bottom recess or pouch 24. This, of course, prevents the toaster T from becoming fouled by the greases, and renders the cooking operation clean and simple and entirely unattended by any necessity for cleaning the toaster. Moreover, it prevents the meat product from stewing in its own juices.

While it is believed that the handle tab 18 will constitute an adequate indicator for advising the user of the envelope as to the position in which the envelope should be placed in the toaster, either one or both of the panels 19 and 20 may be inscribed with proper directions for indicating the correct position of the envelope in the toaster, such as "This End Up," as is illustrated in Figure 5.

Operation

While the manner of using the package unit made up of a plurality of the metallic foil envelopes of this invention is believed to be obvious from the illustration of the drawing and description of parts given, it may be briefly outlined as follows:

It will be assumed that a plurality of the envelopes E is assembled in the package unit U in accordance with the dictates of the retail trade. Thus, six envelopes each containing a minute steak is assembled in one package unit U by the stitching along the lines 14 and 15. These package units U are sold as such to the housewife or other consumer.

When it is desired to cook a minute steak in the toaster T, the user simply grasps the main body portion of one of the envelopes E and tears it from the package unit. The front and rear wall panels 19 and 20 will be severed along the lines 14 and 15 by the tearing operation. This operation leaves an open top at 22 and a handle tab at 18. The envelope E is now placed in the cooking compartment of the toaster T, and the latter operated in the usual manner to render the toaster effective. Such action is ordinarily accompanied by a depressing or lowering of the envelope. In this depressed position, the handle tab 18 will project above the toaster as depicted in Figure 4.

When the cooking period is automatically terminated by the mechanism of the toaster, the envelope will pop up and advise the user of the completion of the cooking operation. The tab 18 may now be availed of to remove the envelope from the toaster and carry out the manipulation which is necessary to remove the cooked minute steak from the envelope.

While the present invention has been described in conjunction with a minute steak, it is to be clearly understood that it is not to be limited in this respect. The envelope is particularly adapted for use with any meats the cooking of which requires an escape of steam from the top and a collection of the cooking juices at the bottom. It is also adapted for the cooking of foods in which the escape of steam and vapors from the top should be permitted even though it not be necessary to provide for the collection of cooking juices at the bottom.

It will be understood that in lieu of actual stitching along the lines 14 and 15 the material of the panels within the areas 16 may be secured together by crimping or an adhesive. Thus, the several tabs 16 will constitute a solid block or tab which is left as each envelope is pulled therefrom.

After the cooking operation is completed, the envelope may be properly manipulated to pour the juices of cooking out of the open top when they are desired for eating. This action is permitted by the channels 26 and 25 which communicate with the recess 24.

While a preferred specific embodiment of the invention is hereinbefore set forth, it is to be clearly understood that the invention is not to be limited to the exact materials, constructions, and designs illustrated and described, because various modifications of these details may be provided in putting the invention into practice within the purview of the appended claims.

What is claimed is:

1. In a metallic foil food packaging and cooking envelope containing a food element, a pair of confronting metallic foil panels of rectangular shape adhesively secured together along their edges and defined by top, bottom, and side edges, said panels also being secured together along a line spaced from said bottom edge but terminating short of said side edges to provide a recess at the bottom for receiving juices created by cooking, with said recess communicating with the main body portion of the envelope above said line, said panels also being scored along lines spaced from said top edge and one side edge, respectively, to facilitate the removal of a portion thereof to leave an open top.

2. In combination, a food element and a metallic foil cooking envelope receiving said food element, said envelope comprising a pair of confronting metallic foil panels adhesively secured together along their edges and of rectangular formation defined by top, bottom, and side edges, said panels being secured together along a line spaced from said bottom edge above which said food element is supported, said line terminating short of said side edges whereby a bottom recess is provided in communication with that portion of the envelope receiving the food element, said panels also being provided with scored lines for facilitating the removal of a portion thereof to leave an open top.

3. A package unit comprising a plurality of metallic foil envelopes of substantially rectangular formation defined by top, bottom, and side edges, with each envelope consisting of a pair of confronting metallic foil panels adhesively secured together along said edges, stitching passing through all of said panels along lines spaced from said top edges and one of said side edges, respectively, the panels of each envelope being adhesively secured together along a line spaced from the bottom edge thereof and terminating short of the side edges thereof to provide a recess at the bottom for receiving juices generated during cooking, and a food element in said envelope above said line.

4. A package unit comprising a plurality of metallic foil envelopes of substantially rectangular formation defined by top, bottom, and side edges, with each envelope consisting of a pair of confronting metallic foil panels adhesively secured together along said edges, stitching passing through all of said panels along lines spaced from said top edges and one of said side edges, respectively, the panels of each envelope being adhesively secured together along a line spaced from the bottom edge thereof and terminating short of the side edges thereof to provide a recess at the bottom for receiving juices generated during cooking, and a food element in said envelope above said line, said food element being supported in position between said panels leaving spaces at each side communicating with the recess at the bottom and having a handle tab at the top that is left when the envelope is removed from the package unit by severing along said stitching lines.

References Cited in the file of this patent

UNITED STATES PATENTS

| | | |
|---|---|---|
| 2,346,564 | Drullard | Apr. 11, 1944 |
| 2,350,931 | Salfisberg | June 6, 1944 |
| 2,533,554 | Byerly | Dec. 12, 1950 |
| 2,541,674 | Snyder | Feb. 13, 1951 |
| 2,609,301 | Lindsey | Sept. 2, 1952 |
| 2,633,284 | Maffett et al. | Mar. 31, 1953 |
| 2,807,550 | Zarotschenzeff et al. | Sept. 24, 1957 |